United States Patent
Brown et al.

[11] Patent Number: 5,788,604
[45] Date of Patent: Aug. 4, 1998

[54] REMOVABLE GRAB BAR COVER

[75] Inventors: Bryan M. Brown, East Amherst; John S. Canna, Orchard Park, both of N.Y.

[73] Assignee: Fisher-Price Inc., East Aurora, N.Y.

[21] Appl. No.: 554,912

[22] Filed: Nov. 9, 1995

[51] Int. Cl.⁶ ................................................ B62B 9/12
[52] U.S. Cl. ........................ 280/642; 280/47.4; 150/154
[58] Field of Search ............................. 280/642, 643, 280/644, 647, 648, 649, 650, 47, 38, 47.371, 33.993, 47.4, 304.1; D12/128, 129, 133; 150/154, 158; 297/464, 467, 487

[56] References Cited

U.S. PATENT DOCUMENTS

| | | | |
|---|---|---|---|
| D. 311,363 | 10/1990 | Lin | D12/129 |
| D. 362,832 | 10/1995 | Haut et al. | D12/129 |
| D. 363,260 | 10/1995 | Huang | D12/129 |
| 1,376,625 | 5/1921 | Johnston | 297/467 |
| 1,391,249 | 9/1921 | Finney | 297/154 |
| 1,704,346 | 3/1929 | Schneider | 297/467 |
| 3,365,210 | 1/1968 | Patterson | 280/644 |
| 3,762,768 | 10/1973 | Hyde et al. | 297/253 |
| 3,829,113 | 8/1974 | Epelbaum | D12/129 |
| 4,248,443 | 2/1981 | Ohlson | 280/650 |
| 4,293,144 | 10/1981 | Ida | 280/644 |
| 4,540,219 | 9/1985 | Klinger | 297/487 |
| 4,579,385 | 4/1986 | Koenig | 297/464 |
| 4,678,222 | 7/1987 | Kassai | 296/77.1 |
| 4,852,894 | 8/1989 | Dyer | 280/30 |
| 4,988,138 | 1/1991 | Danna et al. | 280/87.051 |
| 5,121,938 | 6/1992 | Gross et al. | 280/304.1 |
| 5,125,712 | 6/1992 | Stamoutsos | 296/77.1 |
| 5,184,835 | 2/1993 | Huang | 280/642 |
| 5,375,869 | 12/1994 | Hsaio | 280/648 |
| 5,457,820 | 10/1995 | Yielding | 2/49.1 |
| 5,507,513 | 4/1996 | Peters et al. | 280/304.1 |
| 5,626,397 | 5/1997 | Reid | 297/467 |

OTHER PUBLICATIONS

"Barbara's Stroller Covers", catalog or advertisement page, Sep. 1990.
Graco Stroller Owner's Manual, Model No. 7750, Copyright 1995 Graco.

Primary Examiner—Robert J. Oberleitner
Assistant Examiner—Frank Vanaman
Attorney, Agent, or Firm—Morgan, Lewis & Bockius LLP; C. Scott Talbot

[57] ABSTRACT

A cover member is attached to the frame of an infant or child carrier such as a stroller. The cover member relates to a removable flexible covering for a laterally extending member such as a grab bar residing between a pair of opposed side portions on a child carrier frame. The upper aspects of the cover may be draped around the grab bar and releasably secured to the grab. In a like manner, the lower aspects of the cover may be releasably secured to the footrest.

27 Claims, 12 Drawing Sheets

REMOVABLE GRAB BAR COVER

BACKGROUND OF THE INVENTION

This invention relates to a cover for a grab bar on an infant carrier such as a stroller. More specifically, the invention relates to a removable flexible covering for a laterally extending member residing between a pair of opposed side portions on a child carrier frame, such as a stroller frame.

Many existing infant carriers, particularly strollers, are equipped with restraining bars, better known as grab bars, which laterally extend between two opposed side portions. The grab bar exists to keep the infant within a predefined area, to provide the infant with a means of stabilizing himself, to provide a convenient hand-hold for the attendant to grab the stroller from the front and as a safety device. The central forward location of the grab bar subjects it to frequent handling, spilled food, and other things, so that the conventional grab bar becomes soiled very quickly. The grab bar of the conventional stroller is permanently encased in padded fabric, effectively precluding the parent or other user from easily cleaning the exposed surface or replacing the soiled fabric on the grab bar. Existing infant carriers are also provided with footrest portions that become dirty due to contact with the child's feet.

SUMMARY OF THE INVENTION

The drawbacks of the prior art are overcome by the apparatus of the invention, which provides a removable cover for a grab bar.

More particularly, according to one aspect of the present invention there is provided a removable flexible covering for a laterally extending member, or grab bar, residing between a pair of opposed side portions on a child carrier frame such as a stroller frame. The upper portions of the grab bar cover drape around the grab bar and are releasably secured to the grab bar by conventional means, for example by snaps. The lower portions of the grab bar cover may be releasably secured to the frame of the infant carrier by conventional means, such as by tethers with snaps. In another aspect, the invention provides a footrest cover portion, which may be an integral part of the grab bar cover, and which is releasably secured to the footrest and/or the frame of the child carrier.

DETAILED DESCRIPTION

Referring to FIGS. 1 through 11 of the attached drawings, the preferred embodiment of the present invention will now be described. The invention is described and illustrated below in the context of an infant's stroller, although the invention may be used on any similar device, such as one in which the occupant may be seated (including, but not limited to, swings, highchairs, bassinets, carriages, car seats, shopping carts, or walkers), where it is desirable to provide a releasable covering or protective surface with the features described below.

Figure 3:
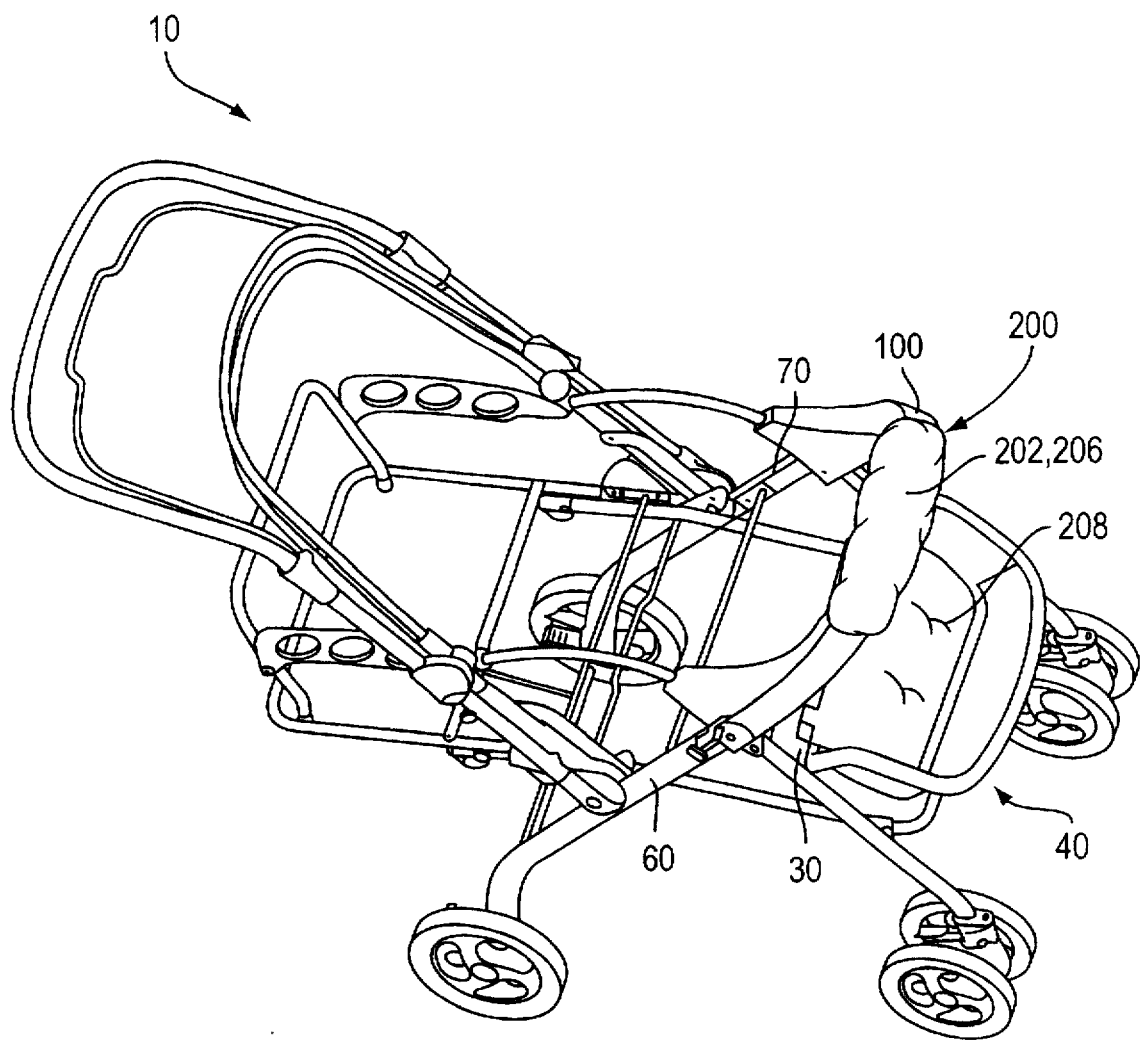
FIG. 3 is a perspective view of an infant stroller employing the grab bar cover with the footrest in its lowered position constructed in accordance with the invention.
Figure 4:
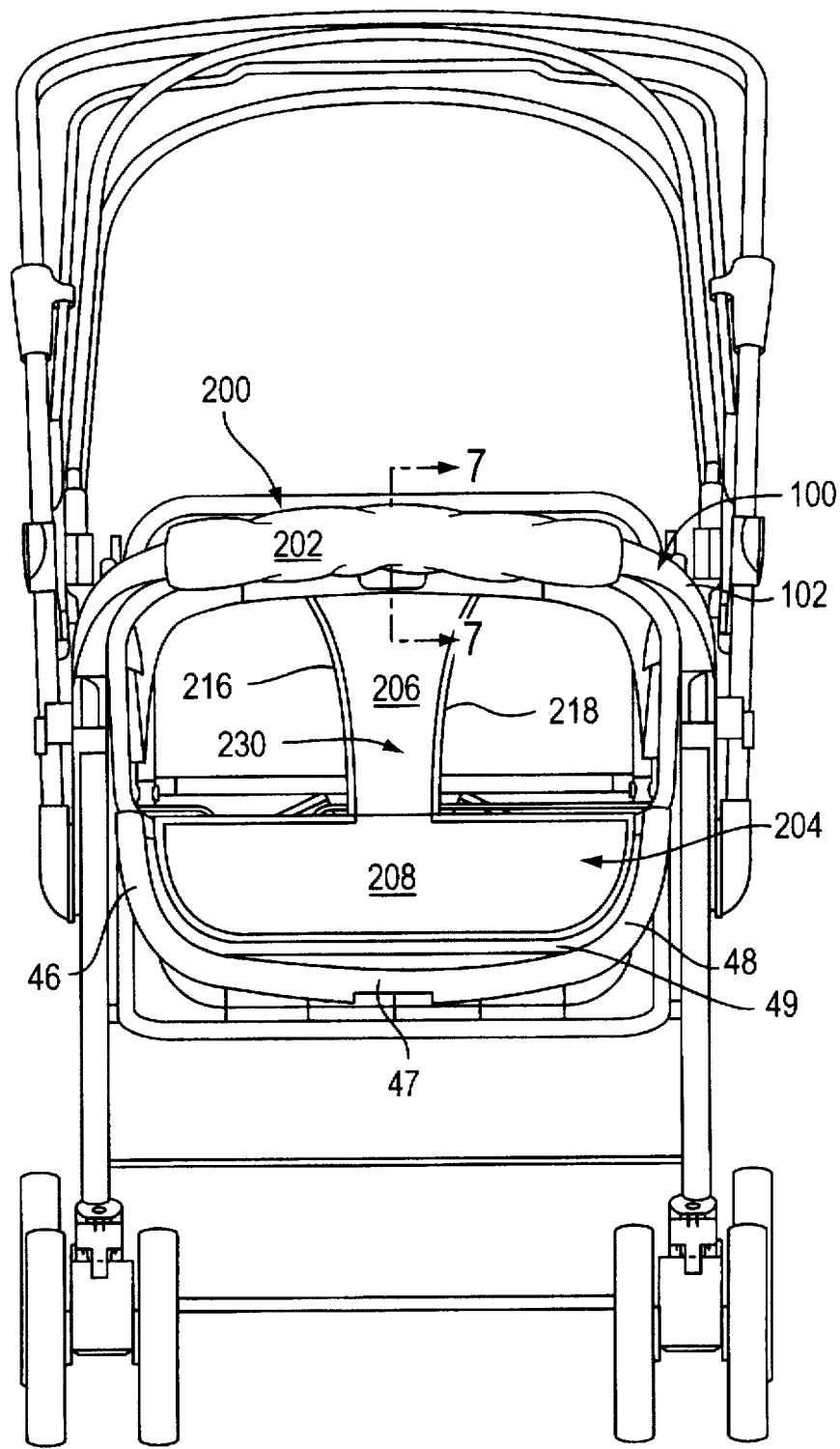
FIG. 4 is a front view of an infant stroller employing the grab bar cover with the footrest in its lowered position constructed in accordance with the invention.
Figure 8:
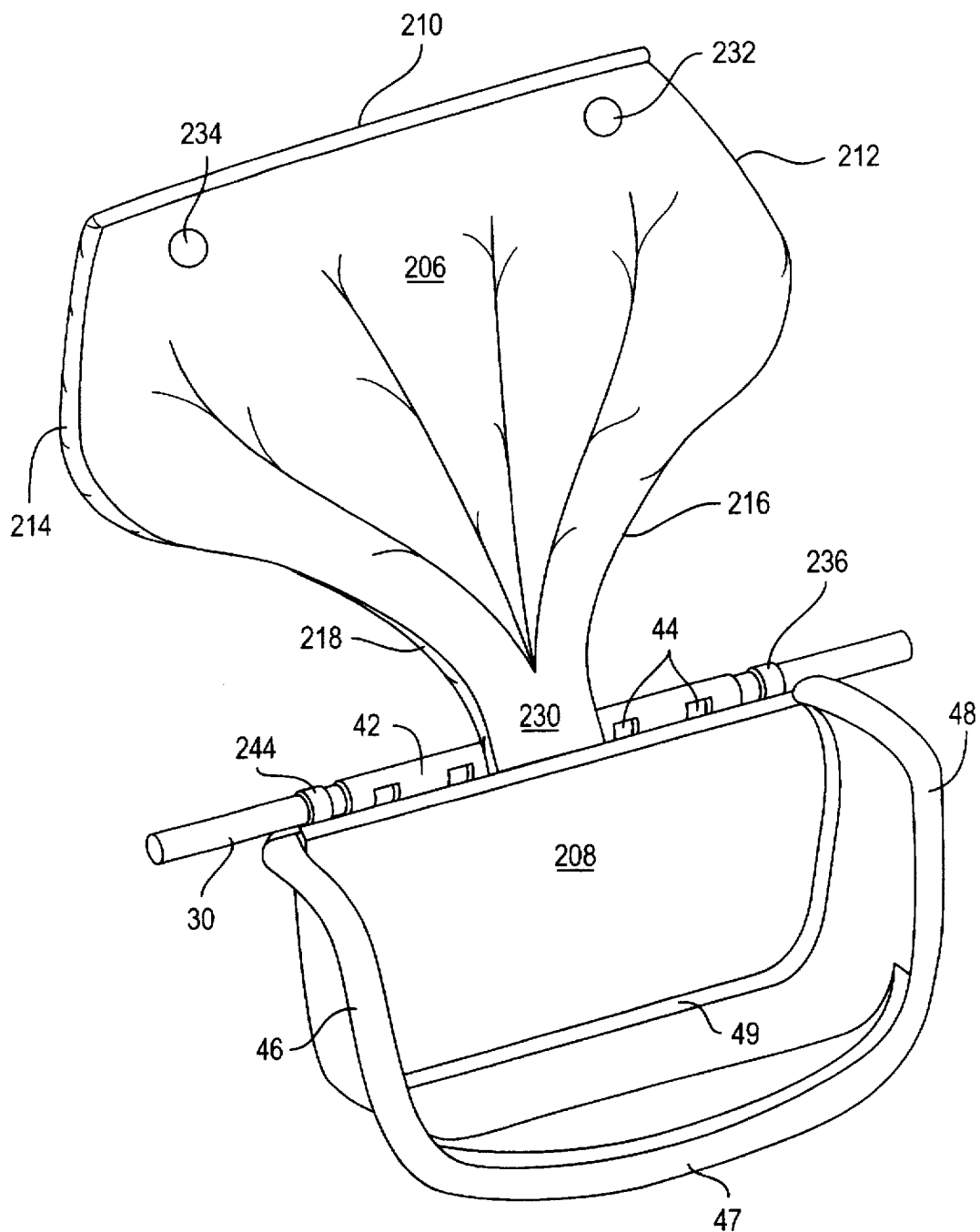
FIG. 8 is a perspective view of the grab bar cover attached to the footrest.
Figure 9:
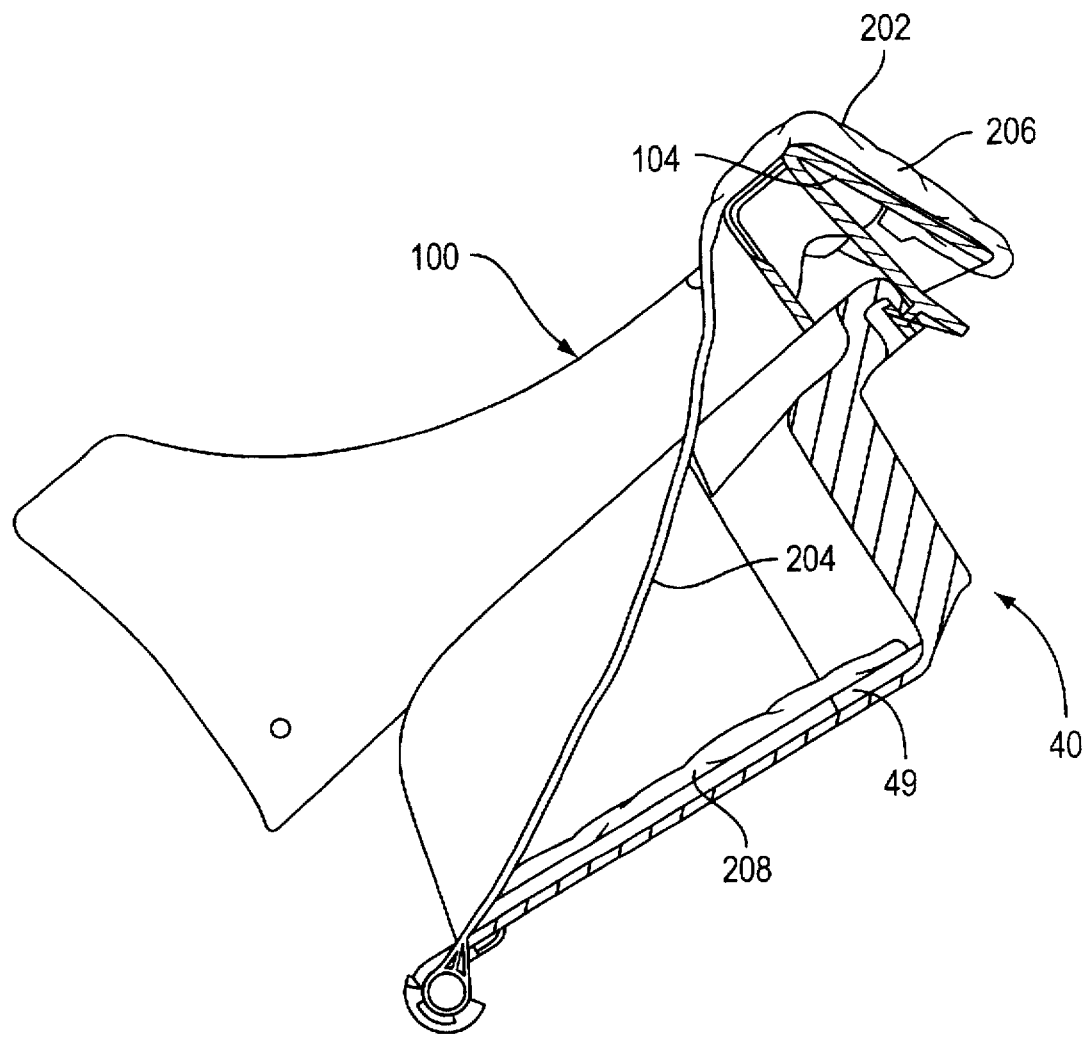
FIG. 9 is a cross-sectional view taken along line 9—9 in FIG. 6 showing the grab bar covering with the footrest in its raised position.

A stroller 10 is illustrated in FIGS. 3 through 6. The stroller 10 includes a laterally extending member 100, a hinge tube 30 and a footrest portion 40 (for purposes of brevity, the laterally extending member 100 is referred to below as the a grab bar). As shown in FIGS. 3 and 4, the grab bar 100 spans the distance between first and second opposed side portions 60, 70. The grab bar 100, shown in more detail in FIGS. 5 through 7 and FIG. 9, includes a front superior surface 102, a front inferior surface 104, a top superior surface 106, a top inferior surface 108, a rear superior surface 110 and a rear inferior surface 112. Permanently attached to the front inferior surface 104 are first and second snap receiving portions 114, 116. The stroller 10 may also include a pivoting footrest portion 40, which is hingedly attached to the hinge tube 30. Of course, the invention does not require a footrest portion 40 to accomplish its objectives. The footrest portion 40 includes a footrest hinge portion 42, footrest hinge apertures 44, first, second and third sidewalls 46, 47, 48 and a footrest center portion 49. Referring to FIG. 8, the footrest center portion 49 comprises the area defined by the first, second and third sidewalls 46, 47, 48. The hinge tube 30 resides between the first and second opposed side portions 60, 70.

Figure 1:
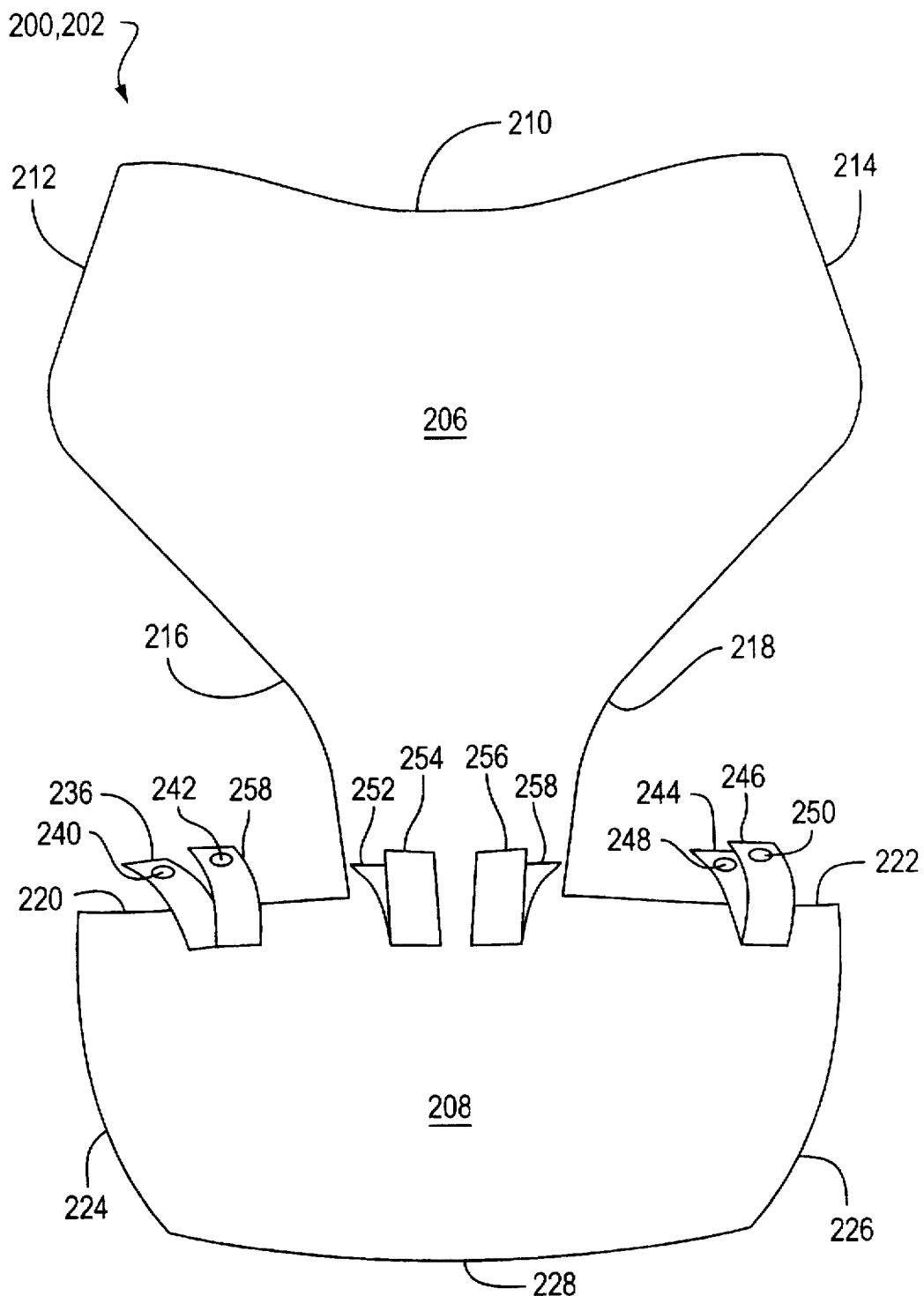
FIG. 1 is a front view of the grab bar cover.
Figure 2:
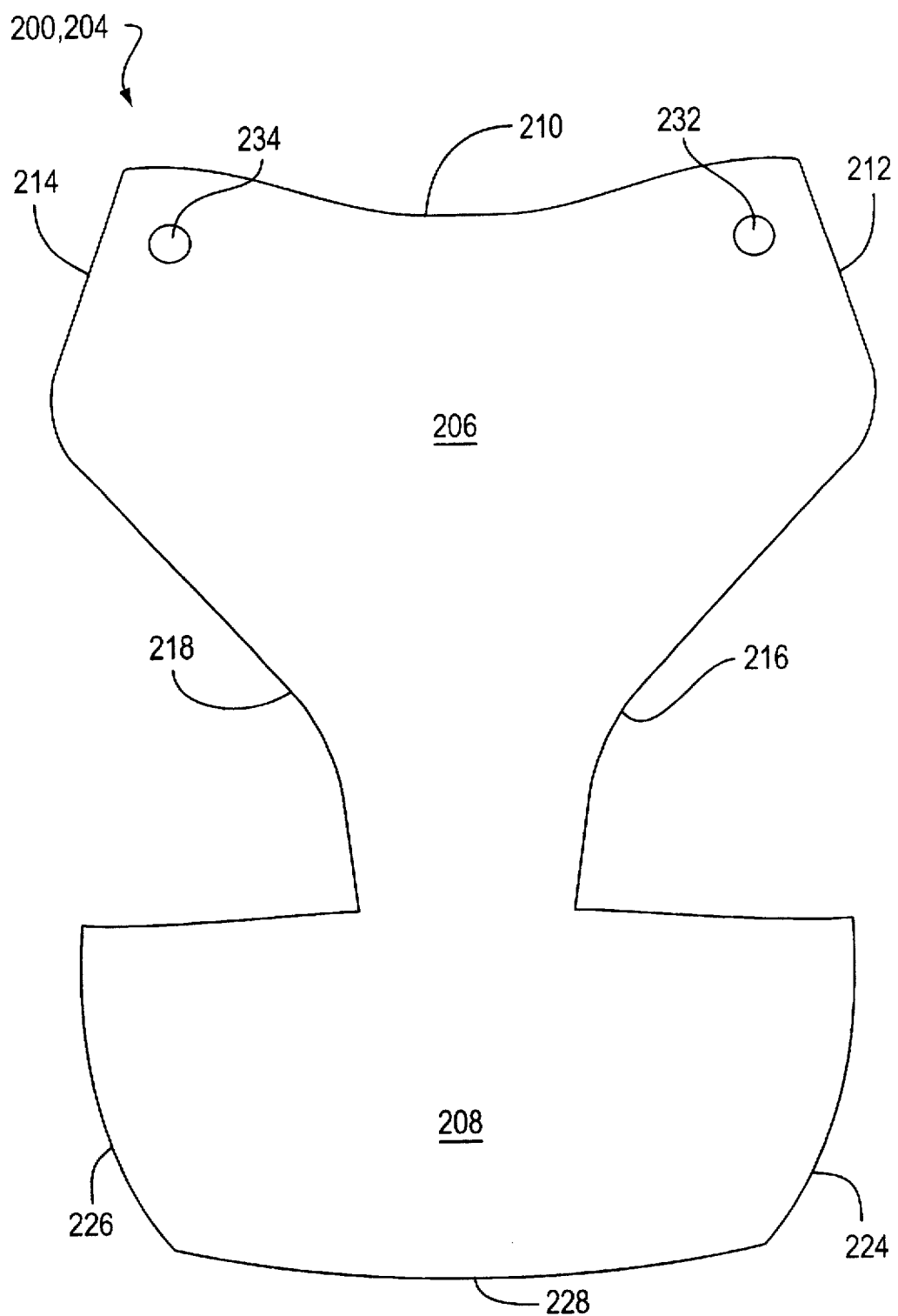
FIG. 2 is a rear view of the grab bar cover.

Referring to FIGS. 1 and 2, the grab bar cover 200 will now be described. The grab bar cover 200 includes superior and inferior cover surfaces 202, 204. The grab bar cover 200 further includes an upper cover portion 206 and a lower cover portion 208. The upper cover portion 206 serves as a releasable covering for the grab bar 100 whereas the lower cover portion 208 serves as a releasable covering for the footrest center portion 49. As best shown in FIG. 1, the upper cover portion 206 has first, second, third, fourth and fifth edges 210, 212, 214, 216, 218. The lower cover portion 208 includes sixth, seventh, eighth, ninth and tenth edges 220, 222, 224, 226, 228. The superior surface 202, shown in detail in FIG. 1, is the surface around the grab bar which is exposed to the outside environment. The second and third edges 212, 214 expand outwardly with respect to their intersection points with the first edge 210. The fourth and fifth edges 216, 218, traversing from their intersection points with the second and third edges 212, 214 towards the lower cover portion 208, taper to form a crotch portion 230. On the lower cover portion 208, integrally connected to the sixth edge 220, proximal the intersection between the sixth edge 220 and the eighth edge 224, are first and second footrest tethers 236, 238. Referring to FIG. 1, a first footrest snap 240 resides at the terminal end of the first footrest tether 236. For reasons which will be described below, a first footrest snap receiving portion 242 resides at the terminal end of the second footrest tether 238. Similarly, integrally connected to the seventh edge 222, proximal the intersection between the seventh edge 222 and the ninth edge 226, are third and fourth footrest tethers 244, 246. A second footrest snap 248 resides at the terminal end of the third footrest tether 244. For reasons which will be described below, a second footrest snap receiving portion 250 resides at the terminal end of the fourth footrest tether 246. Fifth and sixth footrest tethers 252, 254 are located proximal the intersection between the fourth edge 216 and the sixth edge 220. The terminal ends of the fifth and sixth footrest tethers 252, 254 are equipped with fastening means, for example latch and hook connectors, such that the fifth footrest tether 252 may be connected to the sixth footrest tether 254 to form a loop. In like fashion, seventh and eighth footrest tethers 256, 258 are located proximal the intersection between the fifth edge 218 and the seventh edge 222. The terminal ends of the seventh and eighth footrest tethers 256, 258 are equipped with fastening means, such as latch and hook connectors, allowing the seventh footrest tether 256 to be connected to the eighth footrest tether 258 to form a loop.

The inferior surface 204 is illustrated in FIG. 2. Residing on the upper portion 206 near the intersection between the first and second edges 210, 212 is a first snap 232. Similarly, located near the intersection between the first and third edges 210, 214 is a second snap 234.

Operation

Figure 5:
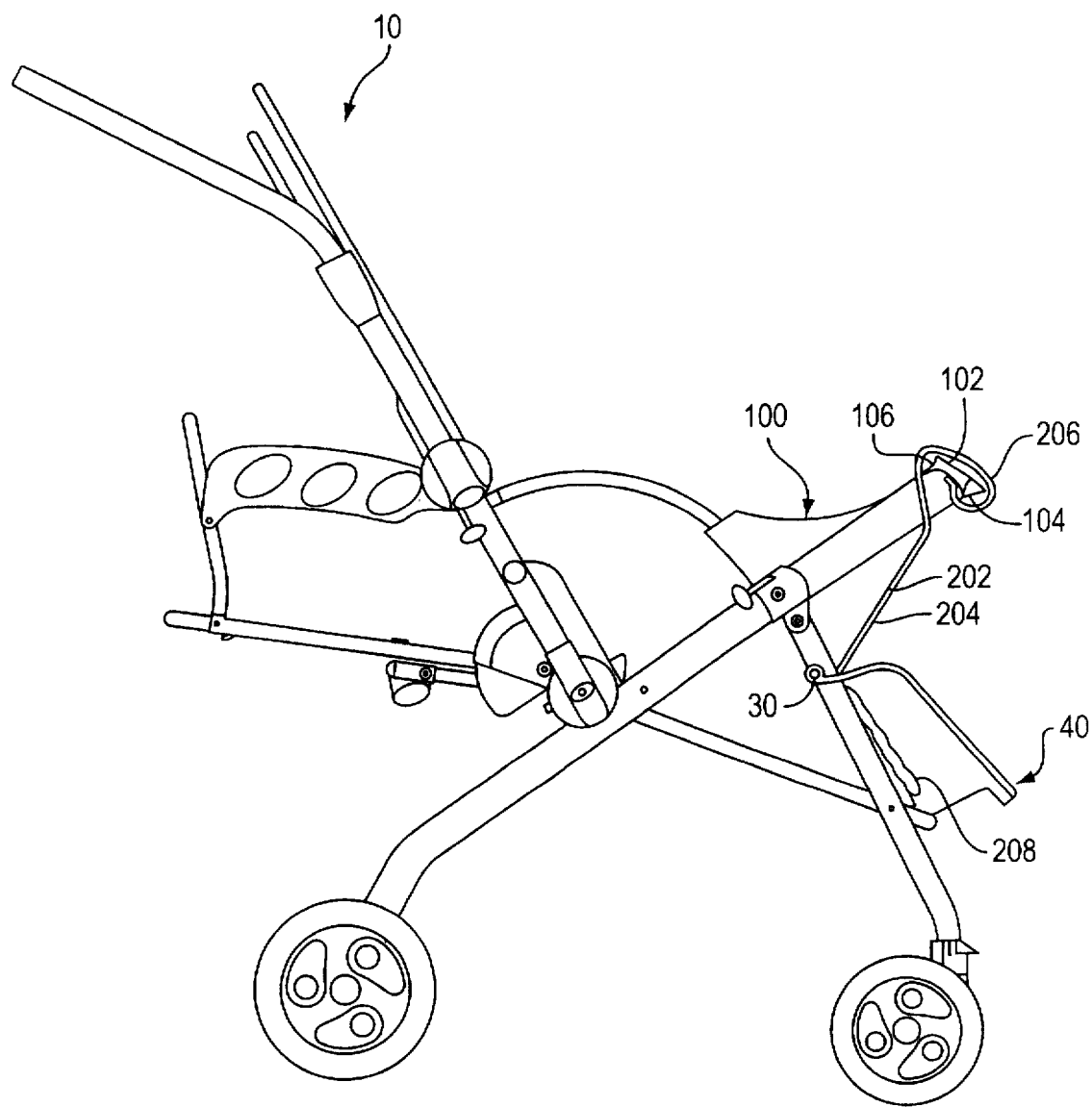
FIG. 5 is a partially cut-away side view of an infant stroller employing the grab bar cover with the footrest in its lowered position constructed in accordance with the invention.
Figure 6:
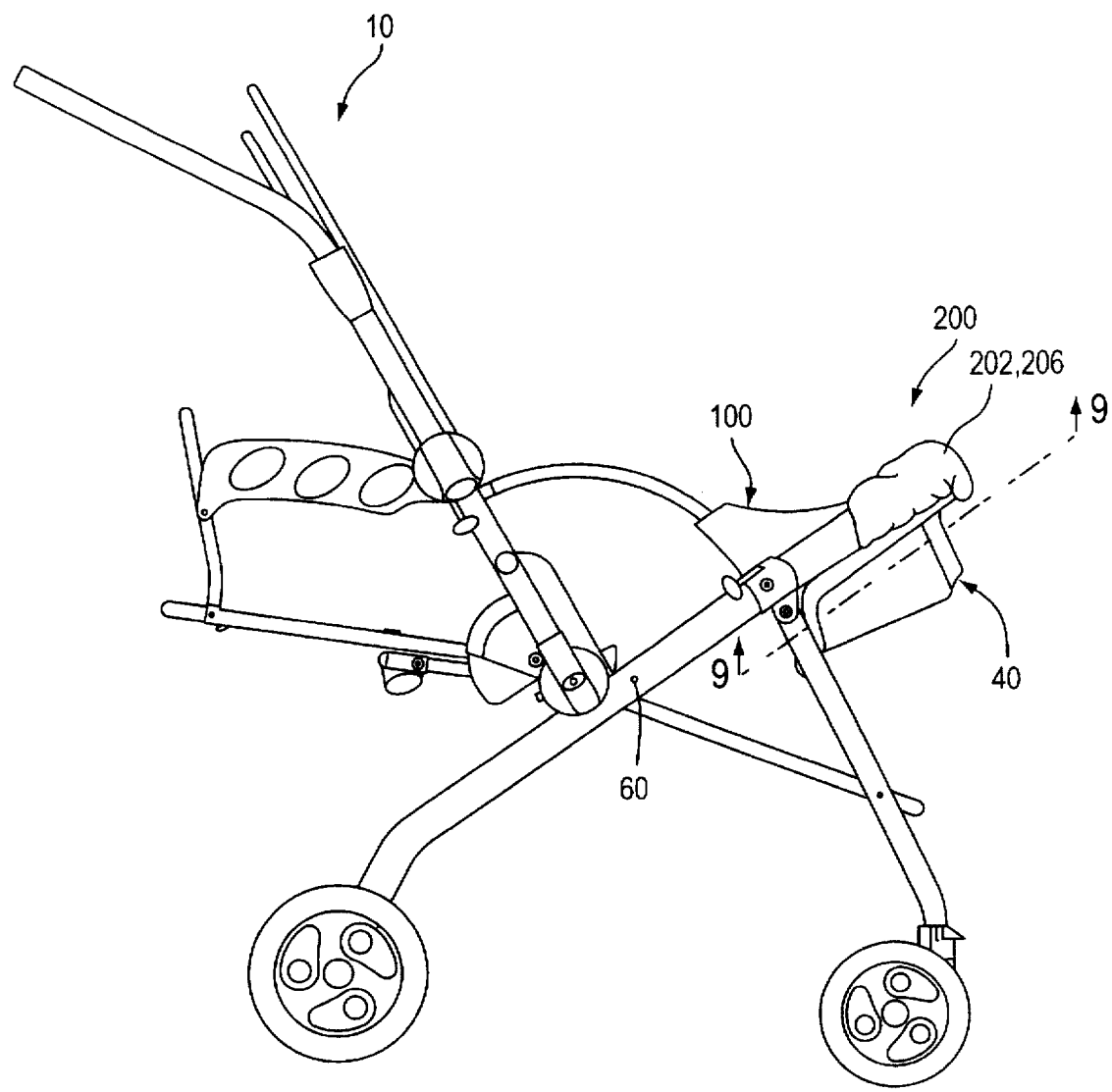
FIG. 6 is a side view of an infant stroller employing the grab bar cover with the footrest in its raised position constructed in accordance with the invention.
Figure 7:
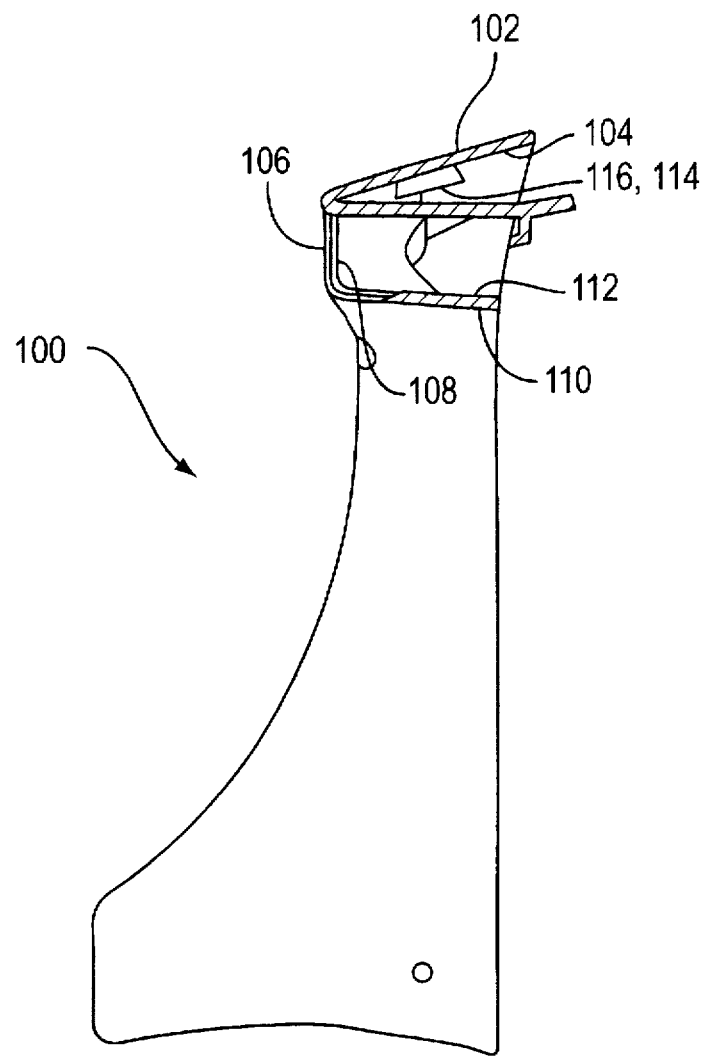
FIG. 7 is a cross-sectional view taken along line 7—7 in FIG. 4 of the grab bar.

The grab bar cover 200 is attached to the stroller frame 10 as follows. The first snap 232, located on the inferior surface 204 of the grab bar cover 200 proximate the intersection between the first and second edges 210, 212, is releasably attached to the first snap receiving portion 114, which resides on the front inferior surface 104 of the grab bar 100. In like fashion, the second snap 234, located on the inferior surface 204 of the grab bar cover 200 proximate the intersection between the first and third edges 210, 214, is releasably attached to the second snap receiving portion 116, which resides on the front inferior surface 104 of the grab bar 100. Once connected, the upper aspects of the inferior cover surface 204 of the grab bar cover 200, including the first edge 210, are in direct contact with the front inferior surface 104 of the grab bar 200. The grab bar cover 200 is draped around the grab bar 100 such that the inferior cover surface 204 of the upper cover portion 206 rests in direct contact with the front superior surface 102, the top superior surface 106 and the rear superior surface 110 of the grab bar 100. As illustrated in FIGS. 4 and 5, the lower aspects of the upper cover portion 206 and the lower cover portion 208 are not in contact with the grab bar 100.

Figure 12A:
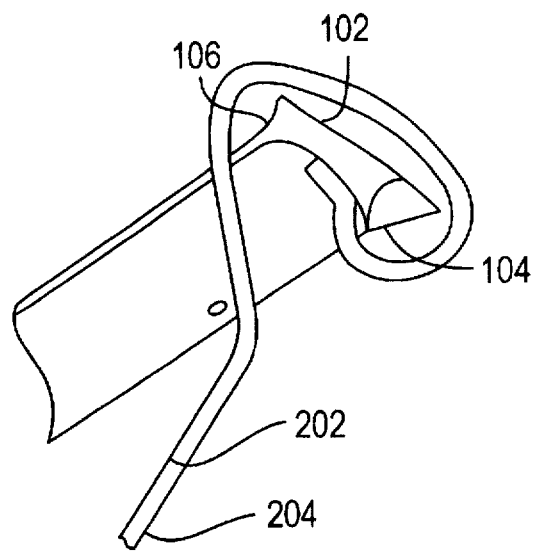
FIGS. 12A and 12B illustrate two technique for attaching the grab bar cover.
Figure 12B:
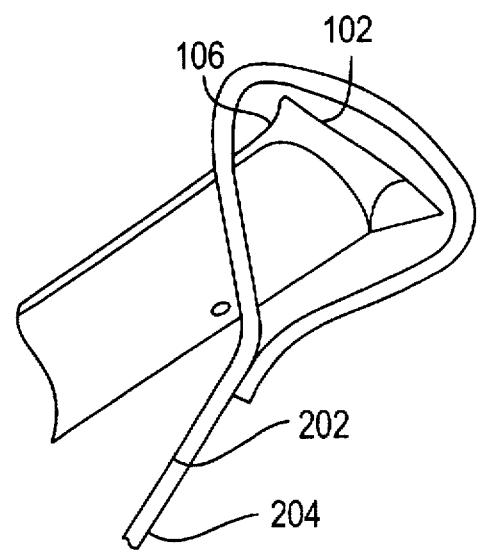

Although in the preferred embodiment the cover snaps directly onto snaps on the grab bar, in other embodiments other fasteners may be used, and/or the cover may encircle the grab bar and fasten to itself as shown in FIGS. 12a and 12b.

Referring to FIGS. 4, 5 and 8, the lower cover portion 208 of the grab bar cover 200 is attached to the stroller frame in the manner described below. In the preferred embodiment, the lower cover portion 208 is attached to the hinge tube 30 for a pivoting footrest 40. However, the lower cover portion 208 may be similarly attached to any horizontal tube or member near the front edge of the seat. Of course, the lower portion of the grab bar cover 200 may hang freely or may be connected to the stroller in a variety of ways, for example directly to a support tube or to the front wheel support tubes. The superior cover surface 202 of the lower cover portion 208 rests against the footrest center portion 49, which is defined by the first, second and third sidewalls 46, 47, 48.

Figure 10:
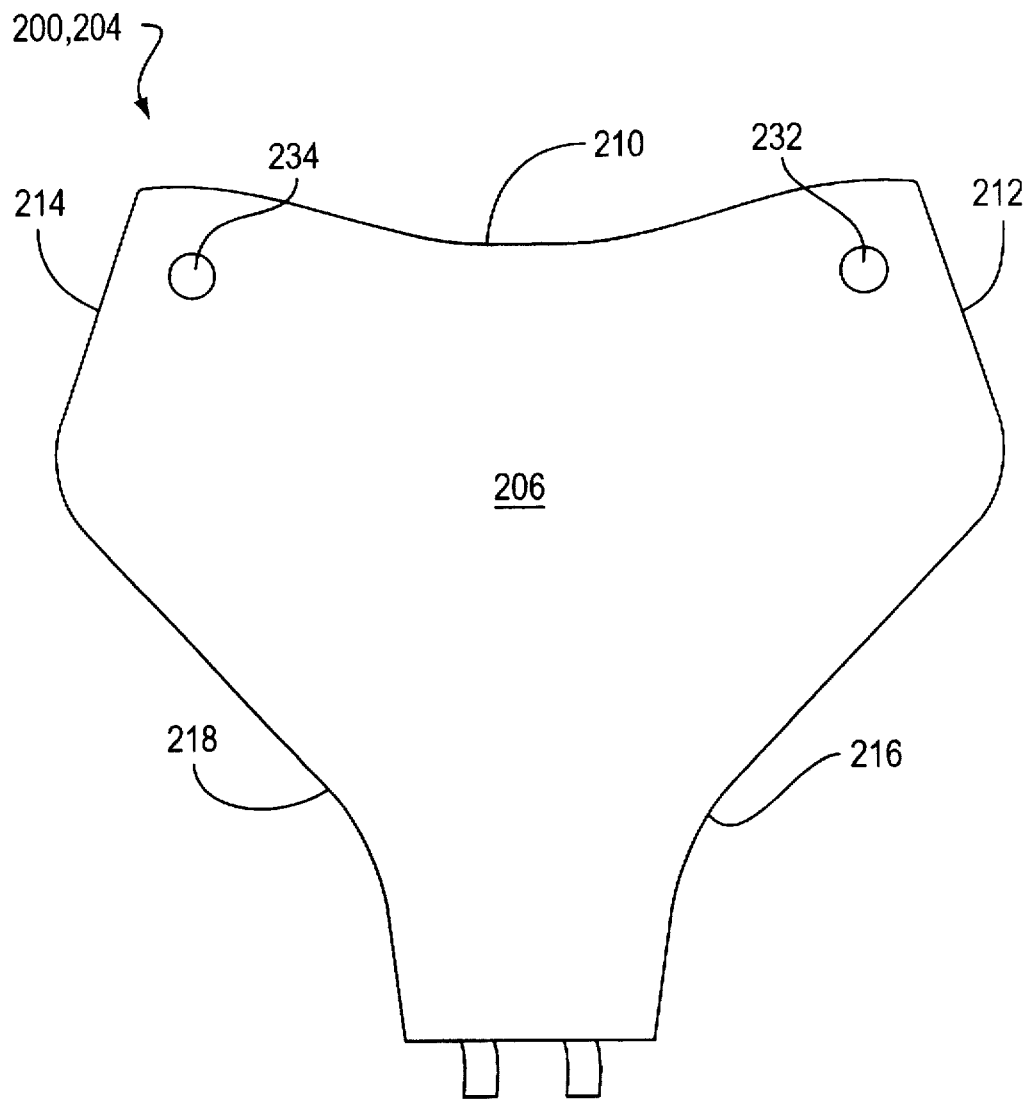
FIG. 10 is a rear view of an alternative embodiment of the invention.
Figure 11:
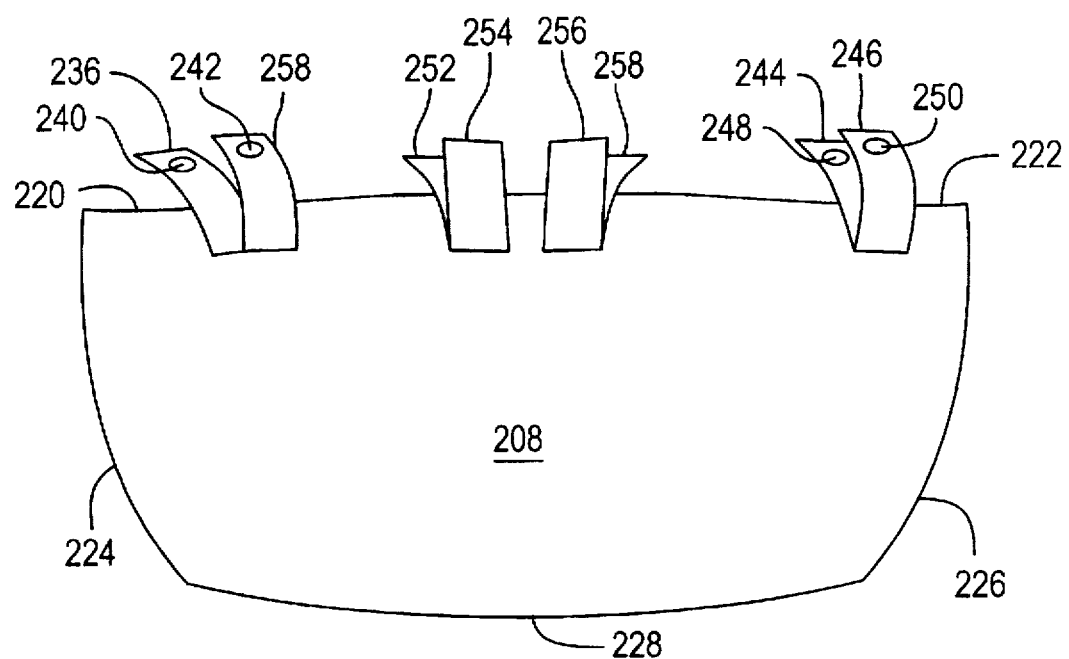
FIG. 11 is a rear view of an alternative embodiment of the invention.

In the preferred embodiment, the cover includes a lower portion 208 forming a footrest cover. However, in alternative embodiments, the upper portion might terminate at the base of crotch portion 230 and the lower portion might be omitted, as seen in FIG. 10. In such case, the bottom end of the crotch portion 230 would be releasably attached in a similar manner, e.g., by tethers like the fifth and sixth tethers 252, 254. In another alternative embodiment, seen in FIG. 11, the upper portion 206 might be omitted and only the lower portion 208 provided, attached to the frame by similar tethers.

As best shown in FIG. 8, the sixth and seventh edges 220, 222 of the lower cover portion 208 extend laterally beyond the footrest hinge portion 42, allowing the first, second, third and fourth footrest tethers 236, 238, 244, 246 to encircle the hinge tube 30. The first and second footrest tethers 236, 238 are placed around the hinge tube 30 such that the first footrest snap 240, residing on the terminal end of the first footrest tether 236, mates with the first footrest snap receiving portion 242 residing on the terminal end of the second footrest tether 238. Once connected, the first footrest snap 240 and the first footrest snap receiving portion 242 lie on one side of the hinge tube 30 whereas the sixth edge 220 lies on the other. In a like manner, the third and fourth footrest tethers 244, 246 are placed around the hinge tube 30 such that the second footrest snap 248, residing on the terminal end of the third footrest tether 244, mates with the second footrest snap receiving portion 250, residing on the terminal end of the fourth footrest tether 246. Once connected, the second footrest snap 248 and the second footrest snap receiving portion 250 lie on one side of the hinge tube 30 whereas the seventh edge 222 lies on the other. To complete the connection between the lower cover portion 208 and the stroller frame 10, the fifth and sixth footrest tethers 252, 254, located on the inferior cover surface 204 proximal the intersection between the fourth edge 216 and the sixth edge 220, are inserted through one of the footrest hinge apertures 54. The fifth and sixth footrest tethers 252, 254 are oriented such that they encircle the hinge tube 30, allowing the fifth and sixth footrest tethers 252, 254 to connect to form a loop. The fifth and sixth footrest tethers 252, 254 are held in this configuration by conventional fastening means, for example by latch and hook fasteners. In similar fashion, the seventh and eighth footrest tethers 256, 258, located on the inferior cover surface 204 proximal the intersection between the fifth edge 218 and the sixth edge 220, are inserted through one of the footrest hinge apertures 44. The seventh and eighth footrest tethers 256, 258 are oriented such that they encircle the hinge tube 30, allowing the seventh and eighth footrest tethers 256, 258 to connect to form a loop. The seventh and eighth footrest tethers 256, 258 are held in this configuration by conventional fastening means, for example by latch and hook fasteners.

The preferred embodiment in constructed such that once the grab bar cover 200 is releasably connected to the grab bar 100 and the hinge tube 30, the fourth and fifth edges 216, 218, which form the crotch portion 230, are in tension. The existence of the crotch portion 230 provides for an additional means to prevent the occupant from sliding under the grab bar 100.

What is claimed is:

1. A flexible covering, for use with a child carrier having a frame with laterally opposed side portions, a footrest extending between the side portions with the footrest having a foot supporting surface on one side thereof, and a first laterally extending member extending between the side portions and spaced vertically above said footrest a distance sufficient to accomodate the legs of a child occupant of the child carrier, comprising:

an upper cover portion for covering part of the laterally extending member; a middle, crotch portion coupled to said upper cover portion, said crotch portion having a lateral extent sufficiently narrow to accomodate each of a child's legs between said crotch portion and a respective side portion;

a lower, footrest cover portion coupled to said crotch portion and sized to cover a majority of the foot supporting surface of the footrest;

means for releasably attaching said upper cover portion to the first laterally extending member; and means for releasably attaching said crotch portion to the frame, said cover lacking a seating surface.

2. A flexible covering according to claim 1, wherein the frame includes a second laterally extending member and said covering comprises means for releasably attaching said cover to the second laterally extending member.

3. A child carrier comprising:

a frame including a pair of laterally opposed side portions, a first laterally extending member extending between said side portions and a second laterally extending member extending laterally between said side portions and spaced vertically below said first laterally extending member a sufficient distance to accomodate a child's legs between said laterally extending members; and a flexible covering having an upper cover portion having a lateral extent sufficient to cover a majority of the lateral extent of the upper surface of said first laterally extending member;

a first fastener coupled to said upper cover portion and releasably engageable with said first laterally extending member to releasably couple said upper cover portion to said first laterally extending member;

a lower crotch portion releasably attachable to said second laterally extending member at a position approximately centrally disposed between said side portions, said crotch portion having a lateral extent sufficiently narrow to accomodate each of a child's legs between said crotch portion and a respective side portion; and a second fastener coupled to said crotch portion and releasably engageable with said second laterally extending member to releasably couple said crotch portion to said second laterally extending member.

4. A child carrier according to claim 3, wherein said child carrier is a stroller.

5. A child carrier according to claim 3, wherein said first laterally extending member is a grab bar.

6. A child carrier according to claim 3, wherein said second laterally extending member comprises a footrest.

7. A child carrier according to claim 6, wherein said footrest is hingedly mounted to said frame.

8. A child carrier according to claim 3, further comprising:

a footrest disposed below said second laterally extending member; and a footrest cover portion coupled to said crotch portion and covering a majority of the upper surface of said footrest.

9. A child carrier comprising:

a frame including a first laterally extending member extending between a pair of opposed side portions;

a flexible covering having an upper cover portion for covering part of the first laterally extending member, said flexible covering lacking a seating surface;

a middle, crotch portion coupled to said upper cover portion, said crotch portion having a lateral extent sufficiently narrow to accomodate each of a child's legs between said crotch portion and a respective side portion;

a first fastener attached to said upper cover portion and releasably engageable with said first laterally extending member to releasably couple said upper cover portion to said first laterally extending member; and a second fastener attached to said crotch portion and releasably engageable with said frame to releasably couple said crotch portion to said frame.

10. A child carrier according to claim 9, wherein said frame includes a second laterally extending member spaced below said first laterally extending member, said crotch portion being releasably coupled to said second laterally extending member.

11. A child carrier according to claim 10, wherein said second laterally extending member comprises a footrest.

12. A child carrier according to claim 11, wherein said footrest is hingedly mounted to said frame.

13. A child carrier according to claim 11, wherein said flexible covering further includes a lower portion covering an upper surface of said footrest.

14. A child carrier according to claim 7, wherein said child carrier is a stroller.

15. A child carrier according to claim 9, wherein said first laterally extending member is a grab bar.

16. A child carrier comprising:

a frame including a first laterally extending member extending between a pair of opposed side portions;

a flexible covering having an upper cover portion, said upper cover portion having a body portion, an end portion, and a lateral extent sufficient to cover a majority of the lateral extent of the upper surface of said first laterally extending member and disposed on said first laterally extending member with said end portion passing around said first laterally extending member and disposed adjacent said body portion of said upper cover portion;

a first fastener releasably coupling said end of said upper cover portion to said body of said upper cover portion;

a lower crotch portion releasably attachable to said frame at a position approximately centrally disposed between said side portions, said crotch portion having a lateral extent sufficiently narrow to accomodate each of a child's legs between said crotch portion and a respective side portion; and a second fastener coupled to said crotch portion and releasably engageable with said frame to releasably couple said crotch portion to said frame.

17. A child carrier according to claim 16, wherein said frame includes a second laterally extending member and said crotch portion is releasably attachable to said second laterally extending member.

18. A child carrier according to claim 17, wherein said covering further comprises a crotch strap portion.

19. A flexible covering according to claim 17, further comprising a third fastener disposed on said crotch portion, said third fastener releasably attachable to said second laterally extending member.

20. A child carrier according to claim 17, wherein said second laterally extending member comprises a tube and a footrest.

21. A child carrier according to claim 20, wherein said footrest is hingedly mounted to said tube.

22. A child carrier according to claim 20, wherein said flexible covering further includes a lower portion for covering part of said footrest.

23. A child carrier according to claim 16, wherein said child carrier is a stroller.

24. A child carrier according to claim 16, wherein said first laterally extending member is a grab bar.

25. A child carrier comprising:

a frame including a footrest and grab bar;

a flexible cover comprising a lower cover portion for covering part of the footrest, said lower cover portion lacking a seating surface;

a crotch strap portion coupled to said lower cover portion at a lower end of said crotch strap, said crotch strap portion releasably coupled to said grab bar at an upper end of said crotch strap;

a first fastener disposed on said lower cover portion; and a second fastener disposed on said lower cover portion, wherein said first and second fasteners are releasably connectable to releasably attach said lower cover portion to said footrest.

26. A child carrier according to claim 25, wherein said child carrier is a stroller.

27. A child carrier comprising:

a frame including a footrest, said footrest having an upper foot supporting surface, a grab bar spaced vertically from said footrest a flexible cover covering said foot supporting surface and lacking a seating surface, said cover including an upper cover portion disposed on said grab bar to cover a substantial portion thereof;

a crotch portion disposed between said grab bar and said footrest;

a fastener releasably coupling said upper cover portion to said grab bar; and means for releasably attaching said cover to said footrest.

* * * * *